US011047362B2

(12) United States Patent
Kiles et al.

(10) Patent No.: US 11,047,362 B2
(45) Date of Patent: Jun. 29, 2021

(54) CLOUD-BASED TURBINE CONTROL FEEDBACK LOOP

(71) Applicant: VayuAI Corp., Mill Valley, CA (US)

(72) Inventors: Jim Kiles, Mill Valley, CA (US); Jon Sigerman, Mill Valley, CA (US); Zachary Lebovitz, Oakland, CA (US); August Kiles, Mill Valley, CA (US); Ashish Badjatia, Pittsburgh, PA (US)

(73) Assignee: VayuAI Corp., Mill Valley, CA (US)

( * ) Notice: Subject to any disclaimer, the term of this patent is extended or adjusted under 35 U.S.C. 154(b) by 0 days.

(21) Appl. No.: 16/212,546

(22) Filed: Dec. 6, 2018

(65) Prior Publication Data

US 2019/0170118 A1 Jun. 6, 2019

Related U.S. Application Data

(60) Provisional application No. 62/594,980, filed on Dec. 5, 2017.

(51) Int. Cl.
| | | |
|---|---|---|
| *F03D 7/02* | (2006.01) | |
| *F03D 7/04* | (2006.01) | |
| *G05B 19/042* | (2006.01) | |

(52) U.S. Cl.
CPC ........... *F03D 7/043* (2013.01); *F03D 7/0204* (2013.01); *F03D 7/0224* (2013.01); *F03D 7/047* (2013.01); *F03D 7/048* (2013.01); *G05B 19/042* (2013.01); *G05B 19/0426* (2013.01); *F05B 2270/32* (2013.01); *F05B 2270/321* (2013.01); *F05B 2270/328* (2013.01); *F05B 2270/329* (2013.01); *F05B 2270/404* (2013.01); *F05B 2270/504* (2013.01); *F05B 2270/70* (2013.01);
(Continued)

(58) Field of Classification Search
CPC ...... F03D 7/043; F03D 7/0204; F03D 7/0224; F03D 7/047; F03D 7/048; G05B 19/042; G05B 19/0426
See application file for complete search history.

(56) References Cited

U.S. PATENT DOCUMENTS

| | | | | |
|---|---|---|---|---|
| 2011/0142619 A1* | 6/2011 | Subramanian | .......... | F03D 7/048 416/1 |
| 2014/0234103 A1* | 8/2014 | Obrecht | ................ | F03D 7/0204 416/9 |

(Continued)

*Primary Examiner* — Mark A Connolly
(74) *Attorney, Agent, or Firm* — Morgan, Lewis & Bockius LLP

(57) ABSTRACT

A method and apparatus for applying optimized yaw settings to wind turbines including receiving operating data from at least one wind turbine on a wind farm and sending the data to a supervisory control and data acquisition (SCADA) system on the at least one wind turbine to generate current SCADA data. The current SCADA data is sent a central processing center away from the wind farm. The central processing center includes an optimization system that can generate a new look up table (LUT) including at least one new wind turbine yaw setting calculated using information comprising wind direction, wind velocity, wind turbine location in the wind farm, information from a historic SCADA database, and yaw optimizing algorithms. The new LUT is then sent to a yaw setting selection engine (YSSE) where instructions regarding the use of the new LUT are generated.

13 Claims, 11 Drawing Sheets

(52) U.S. Cl.
CPC .................. *F05B 2270/708* (2013.01); *G05B 2219/24215* (2013.01); *G05B 2219/2619* (2013.01)

(56) References Cited

U.S. PATENT DOCUMENTS

2016/0333855 A1* 11/2016 Lund ........................ F03D 7/045
2018/0038346 A1*  2/2018 Booth ...................... F03D 7/047

* cited by examiner

```
{
 "type": "floris_input",
 "name": "floris_input_file_Example",
 "description": "Example FLORIS Input file",
 "farm": {
  "type": "farm",
  "name": "farm_example_2x2",
  "description": "Example 2x2 Wind Farm",
  "properties": {
   "wind_speed": 8.0,
   "wind_direction": 160.0,
   "turbulence_intensity": 0.06,
   "wind_shear": 0.12,
   "wind_veer": 0.0,
   "air_density": 1.225,
   "wake_combination": "sosfs",
   "layout_x": [
      1212.588798,
      2870.020388,
      4495.092589, ],
   "layout_y": [
      6259.606287,
      5133.832276,
      9182.410837, ]
  }
 },
 "turbine": {
  "type": "turbine",
  "name": "nrel_5mw",
  "description": "NREL 5MW",
  "properties": {
   "rotor_diameter": 126.0,
   "hub_height": 90.0,
   "blade_count": 3,
   "pP": 1.88,
   "pT": 1.88,
   "generator_efficiency": 1.0,
   "eta": 0.768,
   "power_thrust_table": {
    "power": [
     0.0,
     0.15643578,
     0.31287155, ],
    "thrust": [
     1.10610965,
     1.09515807,
     1.0227122,
```

FIG. 10

```
},
"wind_speed": {
  0.0,
  2.5,
  3.52338654,
}
},
"blade_pitch": 0.0,
"yaw_angle": 0.0,
"tilt_angle": 0.0,
"TSR": 8.0
}

"wake": {
"type": "wake",
"name": "wake_default",
"description": "wake",
"properties": {
 "velocity_model": "gauss",
 "deflection_model": "gauss_deflection",
 "parameters": {
  "turbulence_intensity": {
   "initial": 0.1,
   "constant": 0.73,
   "ai": 0.8,
   "downstream": -0.275
  },
  "jensen": {
   "we": 0.05
  },
  "floris": {
   "me": [
    -0.5,
    0.3,
    1.0
   ],
   "aU": 12.0,
   "bU": 1.3,
   "mU": [
    0.5,
    1.0,
    5.5
   ]
  },
  "gauss": {
   "ka": 0.38,
   "kb": 0.004,
   "alpha": 0.58,
   "beta": 0.077
  },
  "jimenez": {
                "kd": 0.05,
                "ad": 0.0,
                "bd": 0.0
               },
               "gauss_deflection": {
                "ka": 0.38,
                "kb": 0.004,
                "alpha": 0.58,
                "beta": 0.077,
                "ad": 0.0,
                "bd": 0.0
               }
              }
             }
            }
           }
```

FIG. 11

CLOUD-BASED TURBINE CONTROL FEEDBACK LOOP

CROSS-REFERENCE TO RELATED APPLICATIONS

This application claims benefit under 35 U.S.C 119 to U.S. application Ser. No. 62/594,980, filed on Dec. 5, 2017, and incorporated herein by reference in its entirety.

BACKGROUND

In conventional wind farms, an operating platform system may be located in the turbine that receives communication from a control system. The control system identifies the wind direction and signals the turbine to rotate to a position 90 degrees to the direction that the wind is coming from or if it measures that the wind speed is too fast, it signals the turbine to shut down. There is a need to create different operational settings with turbines for more effective performance of the wind farms.

Additionally, when wind deflects off of wind turbines, it causes the wind to create a downstream disturbance or turbulence known as wake turbulence. Wind turbines that are downstream may perform poorly. Therefore, it is necessary to correct and steer the wake turbulence so that wind farms have better control. There are several well-known wind theories and algorithms in the art that offer calculations to resolve the problem of wake turbulence. However, these calculations are very complex, require a significant amount of computing power and are primarily designed for research centers and not for a real time communications environment that would be productive in industry. Further, it may not be possible to put enough computing power at the turbine or local wind farm network to execute these calculations. Therefore, the present disclosure includes a method and system to execute these complex calculations in a central processing center which provides different yaw angles to be implemented at the turbines in order to optimize the wind farm for power production. Thus, resulting in more powerful energy production and more profit.

BRIEF SUMMARY

A method includes receiving operating data from at least one wind turbine, wherein the data includes current wind turbine operating conditions, and the at least one wind turbine is located on a wind farm. The operating data may be sent to a supervisory control and data acquisition (SCADA) system on the at least one wind turbine where current SCADA data may be generated. The current SCADA data is sent to an edge system located on a local network at the wind farm and then to a central processing center in a location away from the wind farm. The central processing center may include an optimization system that can generate a new look up table (LUT), the new LUT including at least one new wind turbine yaw setting calculated using information comprising wind direction, wind velocity, wind turbine location in the wind farm, information from a historic SCADA database, and yaw optimizing algorithms. The new LUT is generated and sent to an optimized configuration settings system located at the local network at the wind farm where it is next sent to a yaw setting selection engine (YSSE). The YSSE generates instructions regarding the use of the new LUT and the instructions are executed.

The methods of the disclosure provide steps involved in applying optimized yaw settings at a wind turbine in a wind farm. A method may include receiving current SCADA data including a current yaw setting for a wind turbine, wherein the current SCADA data is received at a yaw setting selection engine (YSSE). Next, a determination is made if a new LUT is available using a YSSE, wherein the YSSE includes logic to determine whether the new LUT is available, and the new LUT comprises at least one new yaw setting. If a new LUT is available, it is received and if at least one yaw setting in the new LUT is different from a current yaw setting, a signal is sent to an operating control system controller to update the current yaw setting to the at least one new yaw setting on an operating control system located at the wind turbine. If the current yaw setting is the same as the at least one new yaw setting, then the method continues to search for an other new LUT. If a new LUT is not available and the prior LUT has expired, a signal is sent to the operating control system located at the wind turbine to turn the wind turbine to a default 90 degrees to the wind if wind direction or wind velocity has changed.

The disclosure provides an apparatus including a processor; and a memory storing instructions that, when executed by the processor, to receive operating data from at least one wind turbine, wherein the data includes current wind turbine operating conditions, and the at least one wind turbine is located on a wind farm. The operating data may be sent to a supervisory control and data acquisition (SCADA) system on the at least one wind turbine where current SCADA data may be generated. The current SCADA data is sent to an edge system located on a local network at the wind farm and then to a central processing center in a location away from the wind farm. The central processing center may include an optimization system that can generate a new look up table (LUT), the new LUT including at least one new wind turbine yaw setting calculated using information comprising wind direction, wind velocity, wind turbine location in the wind farm, information from a historic SCADA database, and yaw optimizing algorithms. The new LUT is generated and sent to an optimized configuration settings system located at the local network at the wind farm where it is next sent to a yaw setting selection engine (YSSE). The YSSE generates instructions regarding the use of the new LUT and the instructions are executed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 10 illustrates SCADA data 1000 in accordance with one embodiment.

FIG. 11 illustrates SCADA data 1000 in accordance with one embodiment.

DETAILED DESCRIPTION

Figure 1:
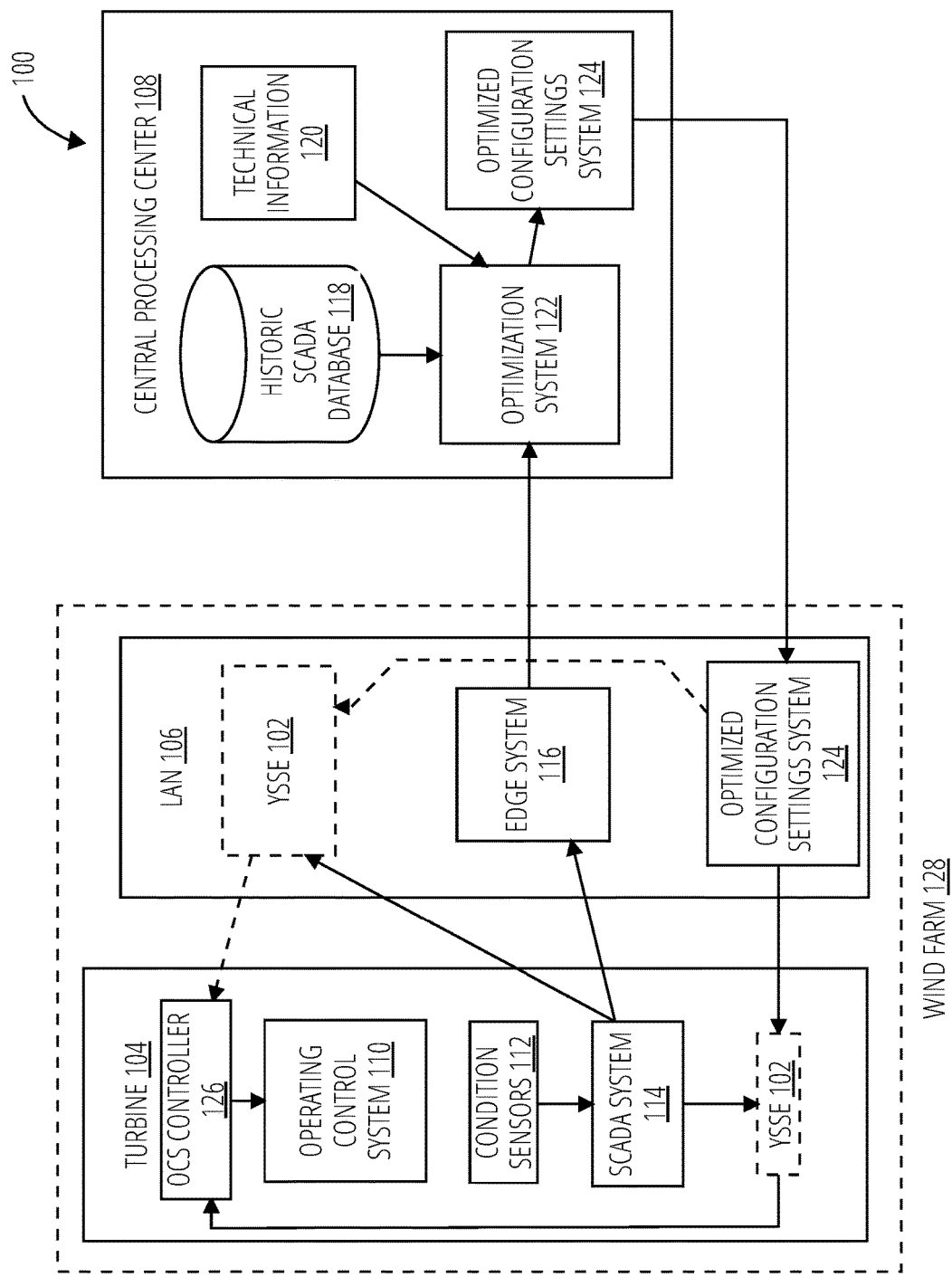
FIG. 1 illustrates a system 100 in accordance with one embodiment.

The present disclosure includes an input-output real-time data streaming system that may receive real-time sensor based and other input data from a plurality of wind farms, process the received data and securely transmit the data in real time to a plurality of independent (and interrelated, e.g. same owner operator) wind farms. The transmitted data may include the computed optimal operational parameters such as digital look up tables or local controller interpretable signals. Further, the system may also include a real-time feedback loop for the data to flow between plants and data center, for example, predicted power plant output versus the actual plant output. The processing of the data may be performed in a central data-processing center outside of the local area network of the wind farm such as an enterprise cloud computing system that may be connected to multiple different wind farms. The cloud computing system may generate a set of look up tables based on data from all connected wind farms and then send the look up tables back to each connected wind farm.

Therefore, the present disclosure includes a method and system to execute these complex calculations in a central processing center, which provides different yaw angles to be implemented at the turbines in order to optimize the wind farm for power production. The resulting system may produce more powerful energy production with greater efficiency and lower operating costs.

The disclosure includes methods and systems that use an input-output real-time data streaming infra-structure designed to receive real-time sensor based and other input data from a plurality of wind farms. The methods and systems may also compute high-fidelity, optimally coordinated, intra-farm farm-wide operations. As part of communication processes, the methods and systems may securely transmit operations control data in real time to a plurality of independent (and interrelated, e.g., same owner operator) wind farms.

Implementations of transmitted data may include computed optimal operational parameters (rendered as digital look up tables or local controller interpretable signals). These methods and systems may accommodate real-time feedback loop data flows between plants and a data center (such as predicted power plant output versus the actual plant output). Flexibility in the systems may allow them to logistically interact with IoT entities and\or ethernet entities, (e.g., local wind farm computer, local server, sensors, SCADA, central sensor-controllers networks) in order to apply machine learning and game theory module intelligence to further improve output. Output may be further enhanced subject to operational or cost constraints.

Components of the system may include, but are not limited to, data processing computers, arrays, and servers. Also present may be high-capacity data storage peripherals integrated with database management components that are tailored for efficient I\O, group security architecture, and big-data anonymous historical data accumulation processes to address the requirements of an enterprise.

In some configurations, a cloud-based, secure, two-way communication infrastructure may be used. Additionally, feed-back loops and data streaming resources of a scale able to handle big data computational processes and high-speed iteration routines may be used. Examples of computational demanding tasks may include 3-dimensional (or other high fidelity) aerodynamic\fluid dynamic physics models adapted for a cloud based SaaS service and other processes integrated with big-data, high-speed iterative machine learning. Additional processes may include those associated with game-theoretical optimizations modules.

The components may also include a central data processing center with operational capabilities including the capability and capacity potential to serve multiple farms, owned by respectively by multiple companies or entities, worldwide. Implicit in the latter capability and capacity is the inclusion of ability to operate as a commercial enterprise, which includes, but is not limited to: technical personnel; system engineers to architect and advance the system; and modules for predicting power output of multiple turbine brands as a function of the operating parameters in this disclosure.

FIG. 1 shows a system 100 comprising a wind farm 128 that may include a turbine 104 and a LAN 106, and a central processing center 108.

The turbine 104 may include condition sensors 112, a Supervisory Control and Data Acquisition SCADA system 114, a yaw setting selection engine (YSSE) 102, an operating control system (OCS) 110 and an OCS controller 126.

The local network LAN 106 may include a yaw setting selection engine (YSSE) 102, an edge system 116 and an optimized configuration settings system 124.

The central processing center 108 may include a historic SCADA database 118, technical information 120, an optimization system 122 and an optimized configuration settings system 124.

The condition sensors 112 may record data and send it to a SCADA system that resides at the turbine. The condition sensors 112 may include temperature sensors, accelerometers, wind sensors, displacement sensors and the like. The SCADA system identifies specific information coming from each turbine such as type of energy being generated, local conditions at the turbines, and the like. The SCADA system may report to an edge system 116 such as an edge computing center that may be located on a local network of a wind farm.

The SCADA system 114 may record wind parameters on a wind turbine such as wind velocity and wind deviations; performance parameters, such as power output, rotor speed, and blade pitch angle; vibration parameters, such as tower acceleration and drive train acceleration; and temperature parameters, such as bearing temperature and gearbox temperature. Data from vibration and traditional measurements, together with data collected by the turbine's SCADA systems, may be analyzed to assess and determine failures, detect early stage of failure, and assess the component's health.

The yaw setting selection engine (YSSE) 102 may be located at the wind turbine or the local network depending on the selection of wind farm operators.

The OCS controller 126 may include an application that is software based that controls the operating control system (OCS) 110, and the operating control system (OCS) 110 may include a communications system.

The edge system 116 may include an edge computing center that communicates SCADA data to a central processing center of the wind farm operator.

The optimized configuration settings system 124 may be located at the local network of the wind farm as well as at the central processing center 108. It receives a generated look up table (LUT) with optimized yaw settings and sends it to the yaw setting selection engine (YSSE) 102. The optimized configuration settings system 124 may also include a memory to store the received LUT.

The central processing center may be a cloud network that processes data for all the wind farm customers. The optimization system 122 processes historic data from all the wind farm, for example 5 years of SCADA data that includes data of what happened on every wind turbine on the wind farm using technical information 120. Technical information 120 may include wind theory to determine the cause of wake turbulence and wind physics systems that have been developed throughout the industry over the years, and algorithms packaged by open source including modifications in order to process in a parallel environment. An example of the relationships between upstream and downstream wind turbines, that may be part of technical information 120, may be found in the article titled Wind Plant Power Optimization Through Yaw Control Using a Parametric Model for Wake Effects— A CFD Simulation Study, by Gebraad, et al., Wind Energy 2014:00, Section 3.6.

The optimization system 122 is needed because computation of the formulas requires significant computing power and is not possible at turbine 104 or LAN 106. The optimized configuration settings system 124 includes a LUT with different combinations of yaw settings based on the historic SCADA database 118. The yaw setting selection engine (YSSE) 102 performs comparisons between current Supervisory Control and Data Acquisition (SCADA) data and the LUT and makes suggestions to the operating control system (OCS) 110 on how to apply the optimized yaw settings at the wind turbine.

For example, in one embodiment of this disclosure, the yaw setting selection engine (YSSE) 102 is located at the turbine 104 and receives optimized yaw settings from the central processing center via a local network (LAN 106). In another embodiment, the yaw setting selection engine (YSSE) 102 may be located at the local network (LAN 106).

Figure 2:
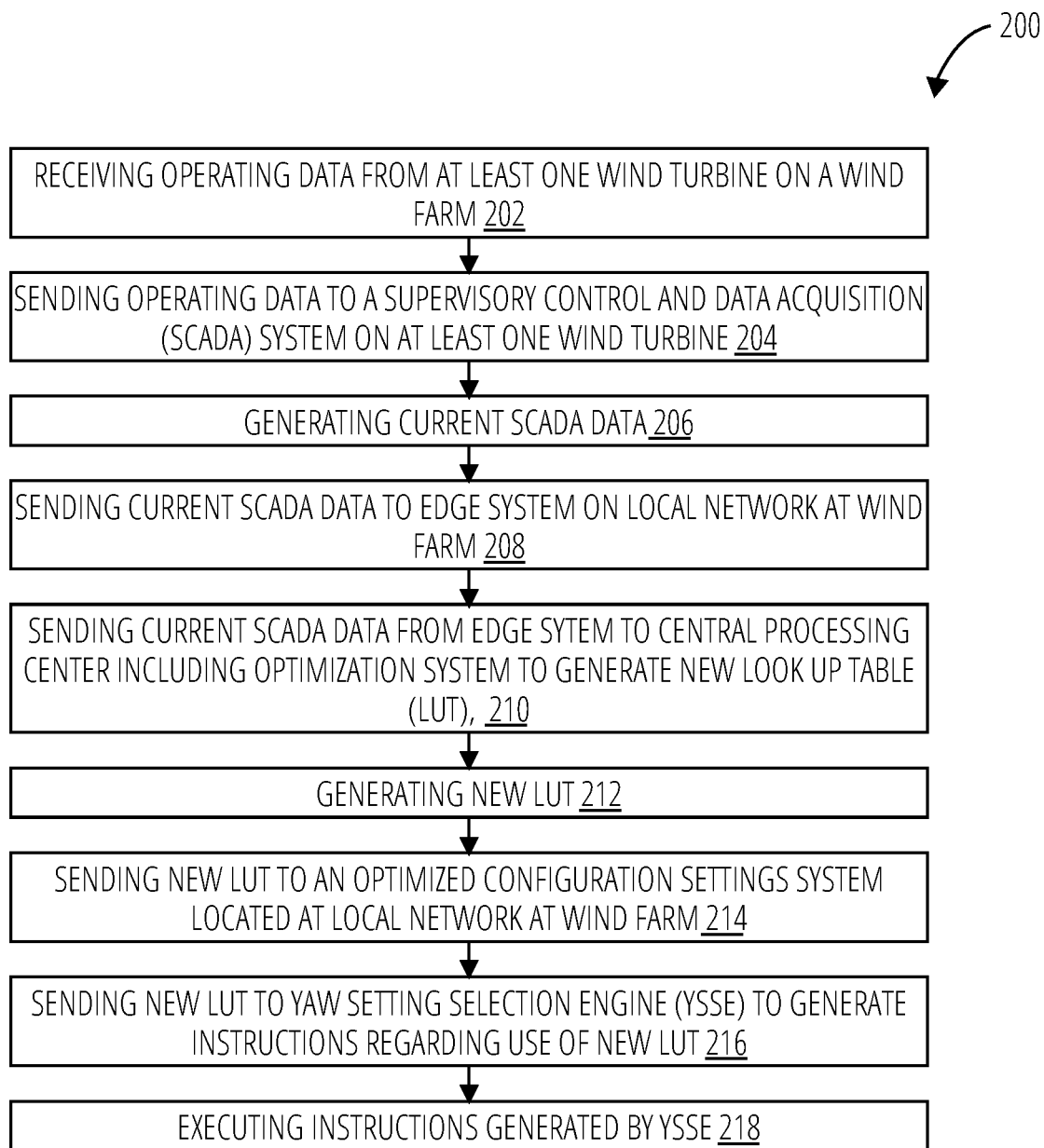
FIG. 2 illustrates a routine in accordance with one embodiment.

In block 202 of FIG. 2, method 200 receives operating data from at least one wind turbine, wherein the data includes current wind turbine operating conditions, and the at least one wind turbine is located on a wind farm. In block 204, method 200 sends the operating data to a supervisory control and data acquisition (SCADA) system on the at least one wind turbine. In block 206, method 200 generates current SCADA data. In block 208, method 200 sends the current SCADA data to an edge system, wherein the edge system is located on a local network at the wind farm. In block 210, method 200 sends the current SCADA data from the edge system to a central processing center, wherein the central processing center is in a location away from the wind farm, wherein the central processing center includes an optimization system that can generate a new look up table (LUT), the new LUT including at least one new wind turbine yaw setting calculated using information comprising wind direction, wind velocity, wind turbine location in the wind farm, information from an historic SCADA database, and yaw optimizing algorithms. In block 212, method 200 generates the new LUT. In block 214, method 200 sends the new LUT to an optimized configuration settings system located at the local network at the wind farm. In block 216, method 200 sends the new LUT from the optimized configuration settings system to a yaw setting selection engine (YSSE), wherein the YSSE generates instructions regarding the use of the new LUT. In block 218, method 200 executes the instructions generated by the YSSE.

Figure 3:
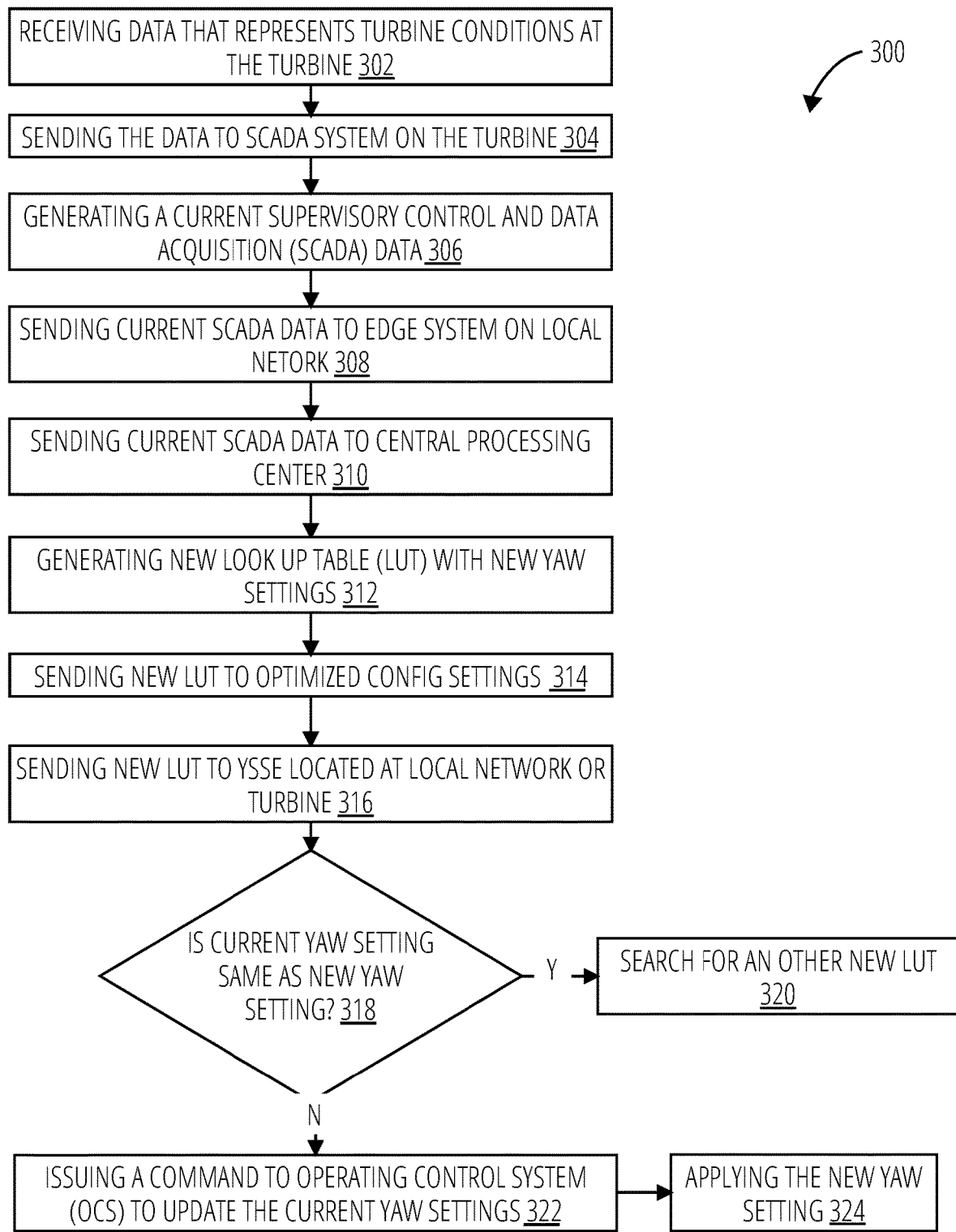
FIG. 3 illustrates a method 300 in accordance with one embodiment.

FIG. 3 includes a method 300 that shows steps involved in applying new yaw settings at a wind turbine in a wind farm. This involves receiving data that represents wind turbine conditions at the turbine (block 302) and sending the data to a Supervisory Control and Data Acquisition (SCADA) system on the turbine (block 304). The method 300 includes generating current SCADA data (block 306), sending the current SCADA data to an edge system located on a local network in the wind farm (block 308), and sending the current SCADA data from the edge system to a central processing center (block 310). The method 300 includes generating a new look up table by an optimization system on the central processing center (block 312), sending the new look up table (LUT) to an optimized configuration settings system (block 314), and sending the new LUT to YSSE (block 316). The method 300 includes determining whether the current yaw setting is same as new yaw setting (decision block 318) and, if yes, then searching for an other LUT (block 320). If the current yaw setting is not the same as the new yaw setting, then method 300 issues a command to operating control system located on the turbine to update the current yaw setting (block 322) and applies the new yaw setting at the turbine (block 324).

An example of a look up table is as follows:

| | | | Turbine #'s and Yaw Angle | | | |
|---|---|---|---|---|---|---|
| Wind Direction | Wind Velocity | Frequency | 1 | 2 | 3 | 4 |
| 0.00 | 4.00 | 2 | 0 | 0 | 0 | 6.71 |
| 0.00 | 5.00 | 5 | 0 | 0 | 0 | 3.28 |
| 0.00 | 6.00 | 7 | 0 | 0 | 0 | 3.45 |
| 0.00 | 7.00 | 2 | 0 | 0 | 0 | 3.42 |
| 0.00 | 8.00 | 5 | 0 | 0 | 0 | 3.51 |

Look up table (LUT)

The above table is a sample of a LUT generated by the optimization system. The table includes many potential combinations of wind velocity and wind direction that have a specific yaw setting that may be implemented for optimizing the wind farm for power production.

Figure 4:
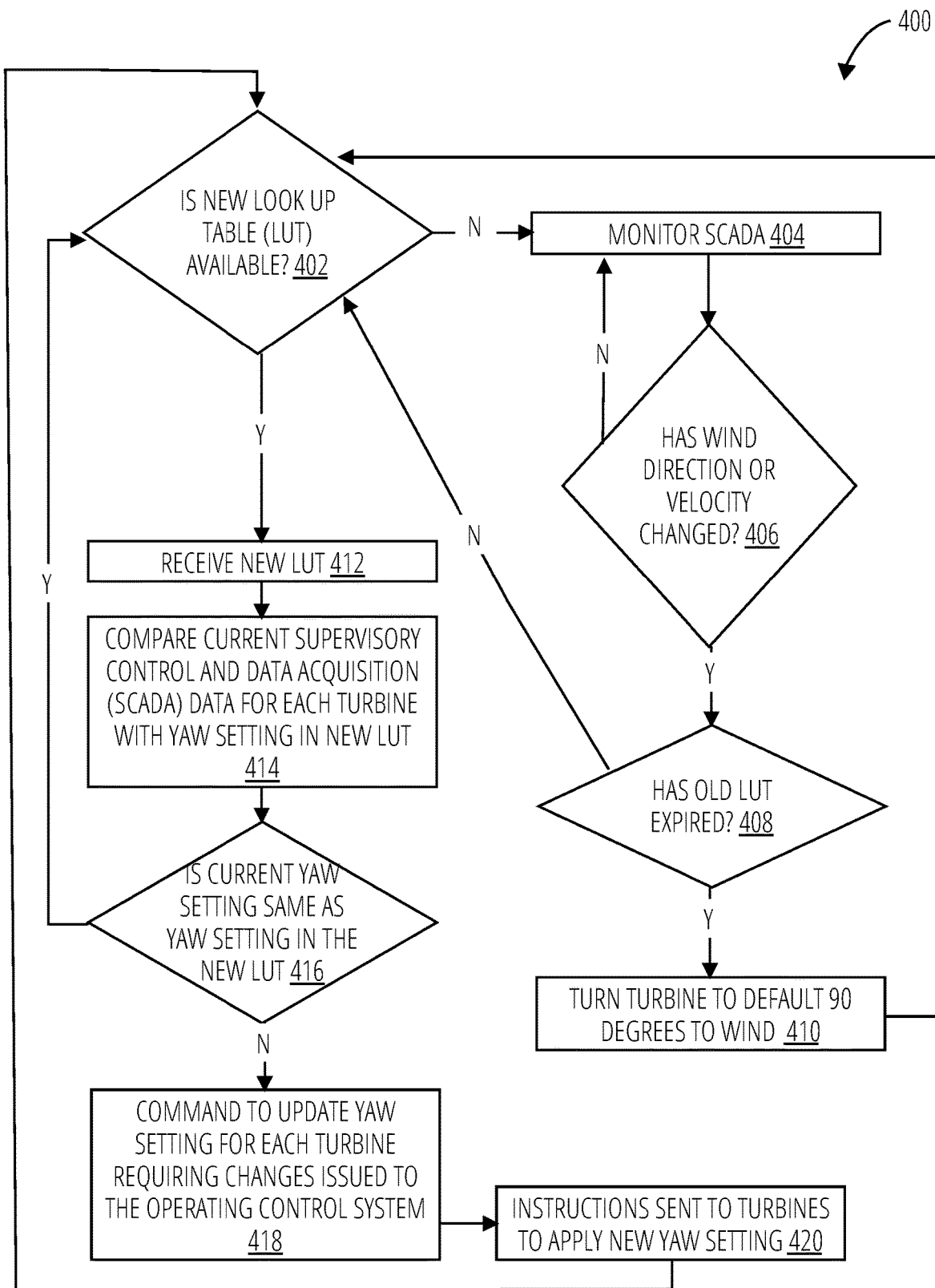
FIG. 4 illustrates a method 400 in accordance with one embodiment.

FIG. 4 shows a method 400 that includes steps that may be included in a yaw setting selection engine (YSEE).

The method 400 comprises determining whether a new look up table (LUT) is available (decision block 402), and if a new look up table is available, receiving the new look up table (block 412). The method 400 compares the current Supervisory Control and Data Acquisition (SCADA) data for each turbine with yaw setting in the new LUT (block 414) and determines if the current yaw setting is same as the yaw setting in the new LUT (decision block 416). If current yaw setting is same as yaw setting in the new LUT (decision block 416), then the method 400 determines whether a new LUT is available (decision block 402). If the current yaw setting is not same as the yaw setting in the new LUT, then the method 400 issues a command to the operating control system to update the yaw setting for each turbine requiring changes (block 418) and sends instructions to the turbines to apply new yaw setting (block 420). The method 400 then determines whether a new LUT is available (decision block 402).

If a new look up table is not available, then the method 400 monitors SCADA (block 404) and determines whether the wind direction or velocity has changed (decision block 406). If the wind direction or velocity has changed then method 400 determines whether the old look up table has expired (decision block 408). If the old LUT table has expired, then the method 400 turns the turbine to a default 90 degrees to wind (block 410) and determines whether a new LUT is available (decision block 402). If the old LUT has not expired, then the method 400 determines whether a new look up table is available (decision block 402). If the wind direction or velocity has not changed, then the method 400 continues monitoring SCADA (block 404).

Figure 5:
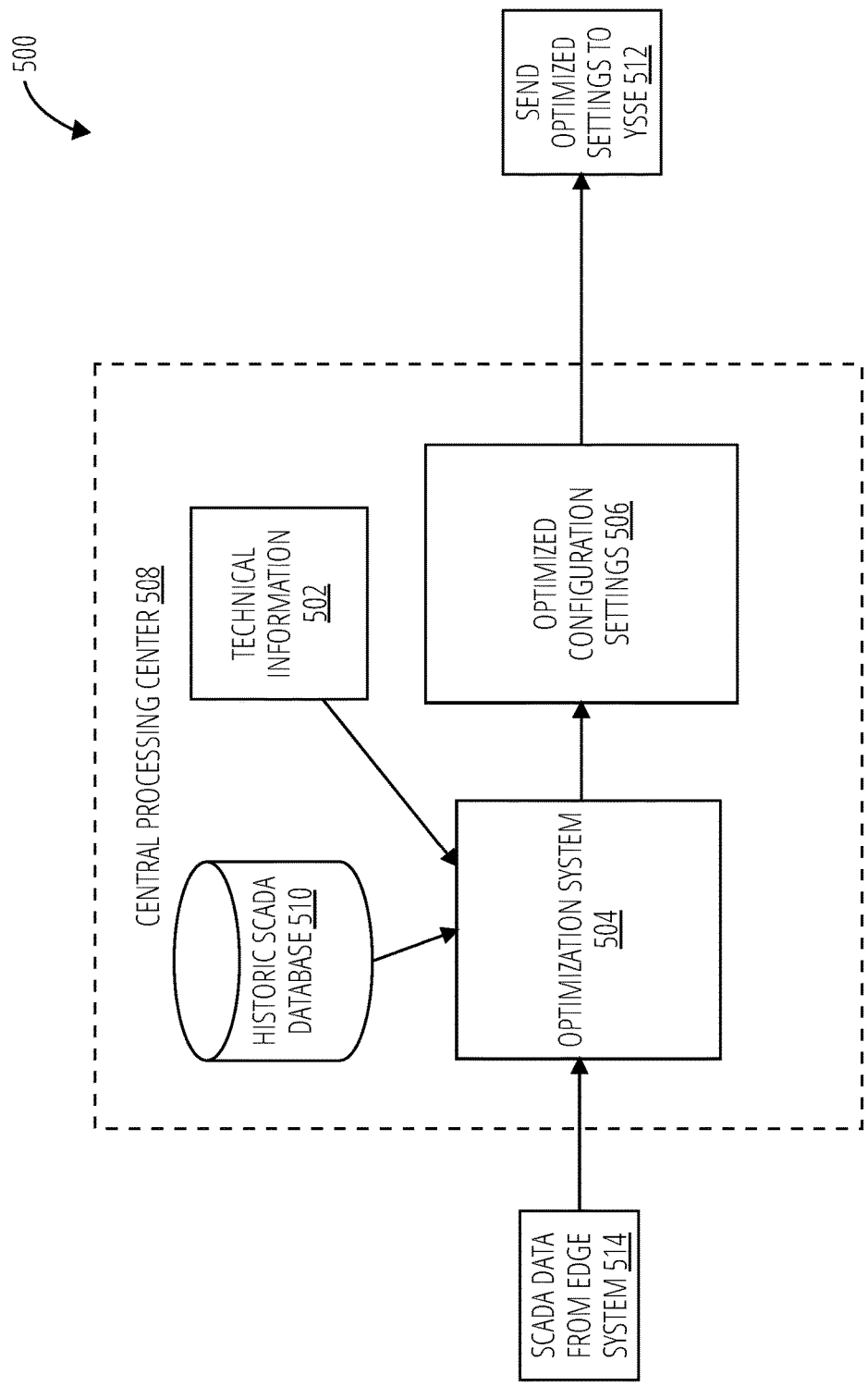
FIG. 5 illustrates a system 500 in accordance with one embodiment.

FIG. 5 shows a system 500 that includes a central processing center 508 that may be connected via cloud communications and feedback loops to the wind-plants. The central processing center 508 may include a historic SCADA database 510, technical information 502, an optimization system 504 and an optimized configuration settings system 506. The SCADA data from edge system 514 is sent to the optimization system 504. At the optimization system 504, a new look up table (LUT) is generated using received current SCADA data, historic SCADA database 510, and algorithms and calculations from technical information 502. This new LUT may include new yaw settings. These new yaw settings are sent to an optimized configuration settings system 506. The optimized configuration settings system 506 sends the new LUT to a yaw setting selection engine (YSSE) (send optimized settings to YSSE 512). The YSSE may be located on a local network of the wind farm or at the turbine.

The central processing center 508 may include computers, arrays and servers. The central processing center 508 may also include group/user level security architectures of various components to accommodate the security requirements for servicing multiple companies, I\O and data-warehousing components for data accumulation and billing metering and other accounting modules linked to individual customer projects, operations, or institutional usage (e.g. usage of data processing and data-transmission resources of the enterprise, wind farm turbine numbers and configurations, and wind farm output performance).

The central data central processing center 508 may accommodate machine learning algorithms and probabilistic models, which require substantial computing power. Additionally, the central processing center 508 may provide service for high-speed feedback loops between the remote farm local computer \ IoT networks, and the computer resource demanding data processing center resources. In an embodiment, the central processing center may be connected via cloud communications and feedback loops to the wind farms, which are customers of, or institutional subscribers to, the services of the enterprise.

Figure 6:
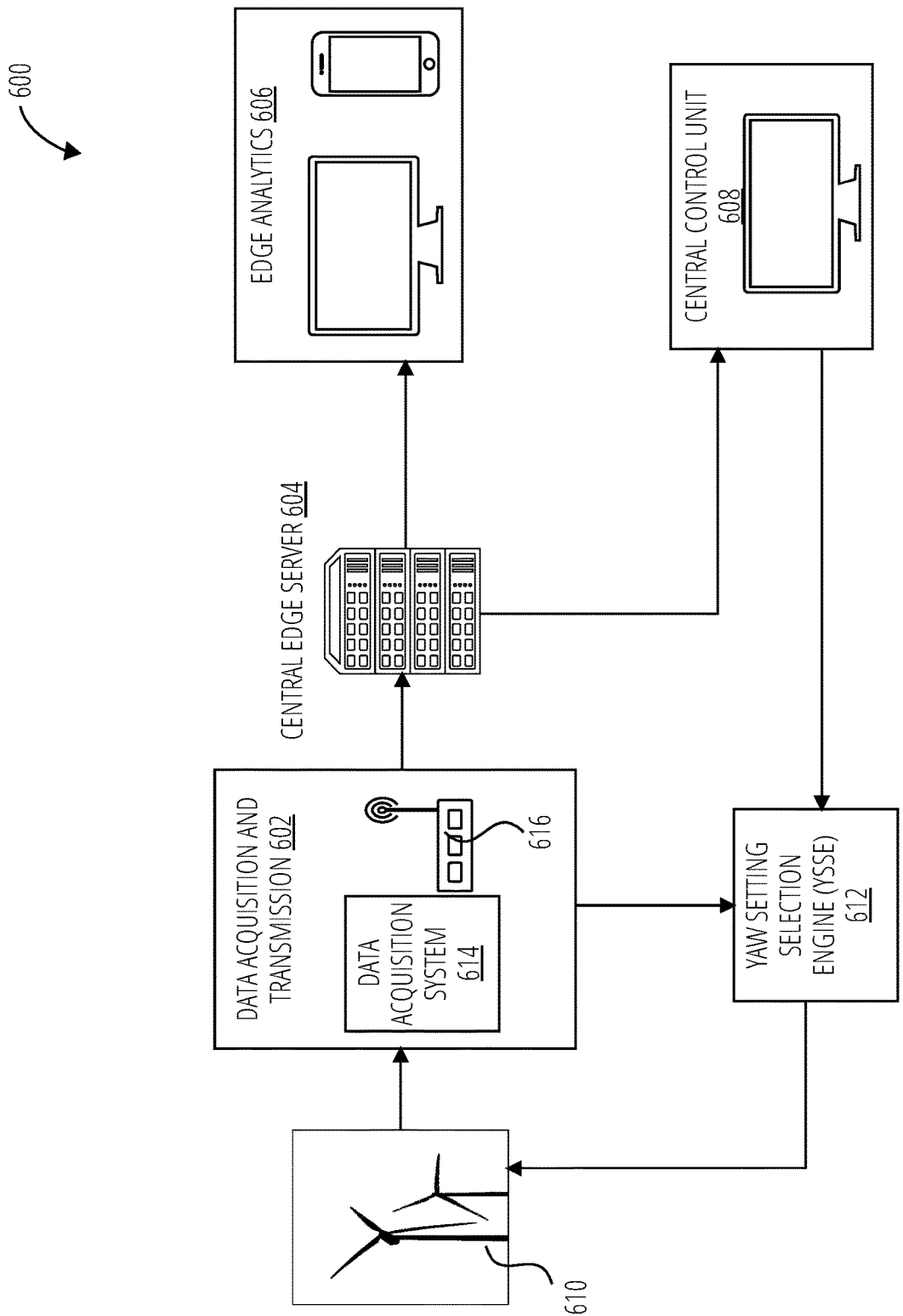
FIG. 6 illustrates a wind farm 600 in accordance with one embodiment.

FIG. 6 shows a wind farm 600 that may include wind turbine units 610, data acquisition and transmission 602, a central edge server 604, edge analytics 606, a yaw setting selection engine (YSSE) 612 and a central control unit 608.

The turbine units 610 may include various components such as sensors, SCADA systems, and the like. The wind farm may be located onshore, offshore, etc.

The data acquisition and transmission 602 may include a data acquisition system 614 and a router 616. The data acquisition system 614, such as a SCADA system, may receive wind turbine conditions and transmit this information to a central edge server 604.

The central edge server 604 may be located on a local network of a wind farm and may transmit the SCADA information to a central control unit 608 such as a central processing center.

The central control unit 608 performs optimization process and returns a LUT, including yaw settings, to a yaw setting selection engine (YSSE) 612. This yaw setting selection engine (YSSE) 612 may include computing devices to compare the yaw settings with the SCADA data and generate a command to apply the yaw settings at the turbines.

The edge analytics 606 may provide visualization of the performance of the wind farm with the help of computing devices.

Figure 7:
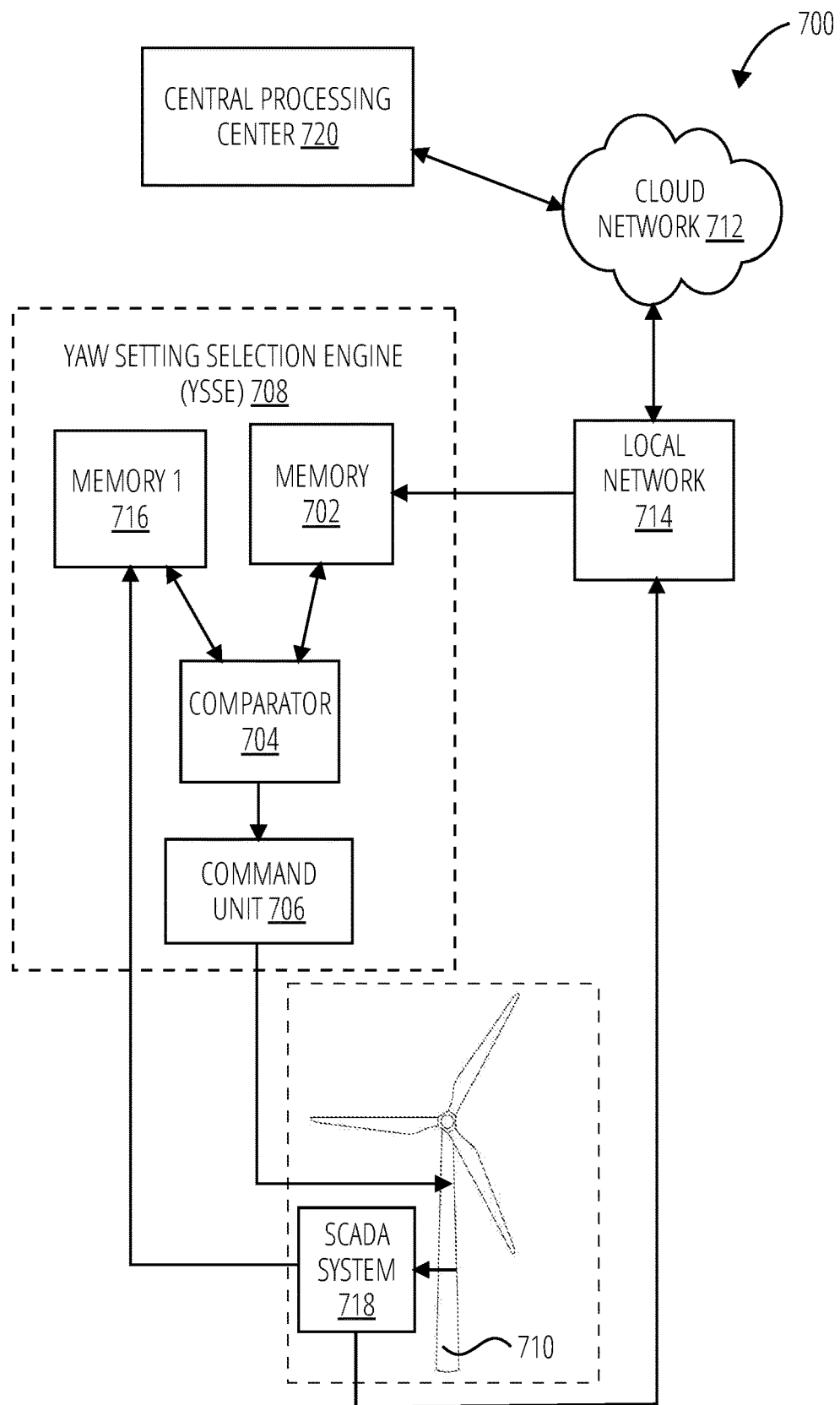
FIG. 7 illustrates a system 700 in accordance with one embodiment.

Referring to FIG. 7, system 700 includes a turbine 710, a SCADA system 718 that may be located at the turbine, a yaw setting selection engine (YSSE) 708, a local network 714, a cloud network 712 and a central processing center 720.

The yaw setting selection engine (YSSE) 708 may include a memory 1 716, memory 702, a comparator 704 and a command unit 706.

The SCADA system 718 receives current turbine conditions and generates SCADA data. This SCADA data may include a wind parameter on a wind turbine, a performance parameter, a vibration parameter, a temperature parameter, and the like.

The yaw setting selection engine (YSSE) 708 may be located at the local network 714 or at the turbine 710. The yaw setting selection engine (YSSE) 708 receives the current SCADA data and a new LUT that may be generated in a central processing center 720 on a cloud network 712. The current SCADA data including a current yaw setting may be stored in memory 1 716 and the new LUT including a new yaw setting may be stored in memory 702. The comparator 704 compares the current SCADA data with the new LUT. If the current yaw settings are different from the new yaw settings, then the comparator 704 may send a signal to the command unit 706 that may generate a command to change the current yaw settings and apply the new yaw setting at the turbine. If the current yaw setting is same as the new yaw setting, then the command unit 706 may do nothing. If a new LUT is not available, and it has been a long period of time (e.g., 1 hour) since a new one has been provided, then the command unit 706 send a command to apply a default yaw setting at the turbine 710. The default yaw setting may include turning the turbine 710 to 90 degrees to the wind.

The memory units, memory 702 and memory 1 716 may include volatile or non volatile memory.

Figure 8:
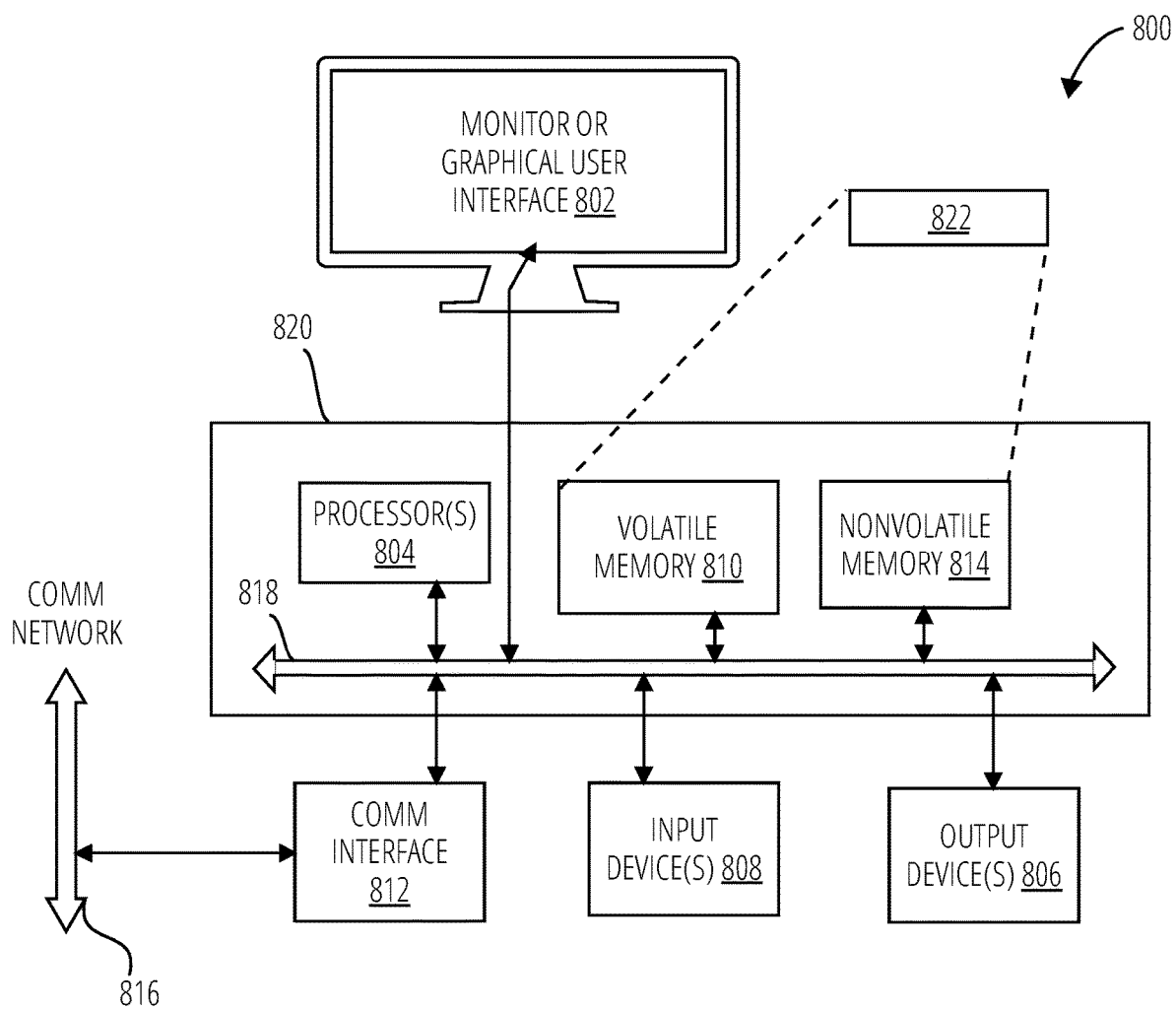
FIG. 8 is an example block diagram of a computing device 800 that may incorporate embodiments of the present invention.

FIG. 8 is an example block diagram of a computing device 800 that may incorporate embodiments of the present invention. FIG. 8 is merely illustrative of a machine system to carry out aspects of the technical processes described herein and does not limit the scope of the claims. One of ordinary skill in the art would recognize other variations, modifications, and alternatives. In one embodiment, the computing device 800 typically includes a monitor or graphical user interface 802, a data processing system 820, a communication network interface 812, input device(s) 808, output device(s) 806, and the like.

As depicted in FIG. 8, the data processing system 820 may include one or more processor(s) 804 that communicate with a number of peripheral devices via a bus subsystem 818. These peripheral devices may include input device(s) 808, output device(s) 806, communication network interface 812, and a storage subsystem, such as a volatile memory 810 and a nonvolatile memory 814.

The volatile memory 810 and/or the nonvolatile memory 814 may store computer-executable instructions and thus forming logic 822 that when applied to and executed by the processor(s) 804 implement embodiments of the processes disclosed herein.

The input device(s) 808 include devices and mechanisms for inputting information to the data processing system 820. These may include a keyboard, a keypad, a touch screen incorporated into the monitor or graphical user interface 802, audio input devices such as voice recognition systems, microphones, and other types of input devices. In various embodiments, the input device(s) 808 may be embodied as a computer mouse, a trackball, a track pad, a joystick, wireless remote, drawing tablet, voice command system, eye tracking system, and the like. The input device(s) 808 typically allow a user to select objects, icons, control areas, text and the like that appear on the monitor or graphical user interface 802 via a command such as a click of a button or the like.

The output device(s) 806 include devices and mechanisms for outputting information from the data processing system 820. These may include the monitor or graphical user interface 802, speakers, printers, infrared LEDs, and so on as well understood in the art.

The communication network interface 812 provides an interface to communication networks (e.g., communication network 816) and devices external to the data processing system 820. The communication network interface 812 may serve as an interface for receiving data from and transmitting data to other systems. Embodiments of the communication network interface 812 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 812 may be coupled to the communication network 816 via an antenna, a cable, or the like. In some embodiments, the communication network interface 812 may be physically integrated on a circuit board of the data processing system 820, or in some cases may be implemented in software or firmware, such as "soft modems", or the like.

The computing device 800 may include logic that enables communications over a network using protocols such as HTTP, TCP/IP, RTP/RTSP, IPX, UDP and the like.

The volatile memory 810 and the nonvolatile memory 814 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 810 and the nonvolatile memory 814 may be configured to store the basic programming and data constructs that provide the functionality of the disclosed processes and other embodiments thereof that fall within the scope of the present invention.

Logic 822 that implements embodiments of the present invention may be stored in the volatile memory 810 and/or the nonvolatile memory 814. Said logic 822 may be read from the volatile memory 810 and/or nonvolatile memory 814 and executed by the processor(s) 804. The volatile memory 810 and the nonvolatile memory 814 may also provide a repository for storing data used by the logic 822.

The volatile memory 810 and the nonvolatile memory 814 may include a number of memories including a main random access memory (RAM) for storage of instructions and data during program execution and a read only memory (ROM) in which read-only non-transitory instructions are stored. The volatile memory 810 and the nonvolatile memory 814 may include a file storage subsystem providing persistent (non-volatile) storage for program and data files.

The volatile memory 810 and the nonvolatile memory 814 may include removable storage systems, such as removable flash memory.

The bus subsystem 818 provides a mechanism for enabling the various components and subsystems of data processing system 820 communicate with each other as intended. Although the communication network interface 812 is depicted schematically as a single bus, some embodiments of the bus subsystem 818 may utilize multiple distinct busses.

It will be readily apparent to one of ordinary skill in the art that the computing device 800 may be a device such as a smartphone, a desktop computer, a laptop computer, a rack-mounted computer system, a computer server, or a tablet computer device. As commonly known in the art, the computing device 800 may be implemented as a collection of multiple networked computing devices. Further, the computing device 800 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator." Likewise, switching may be carried out by a "switch", selection by a "selector," and so on.

Figure 9:
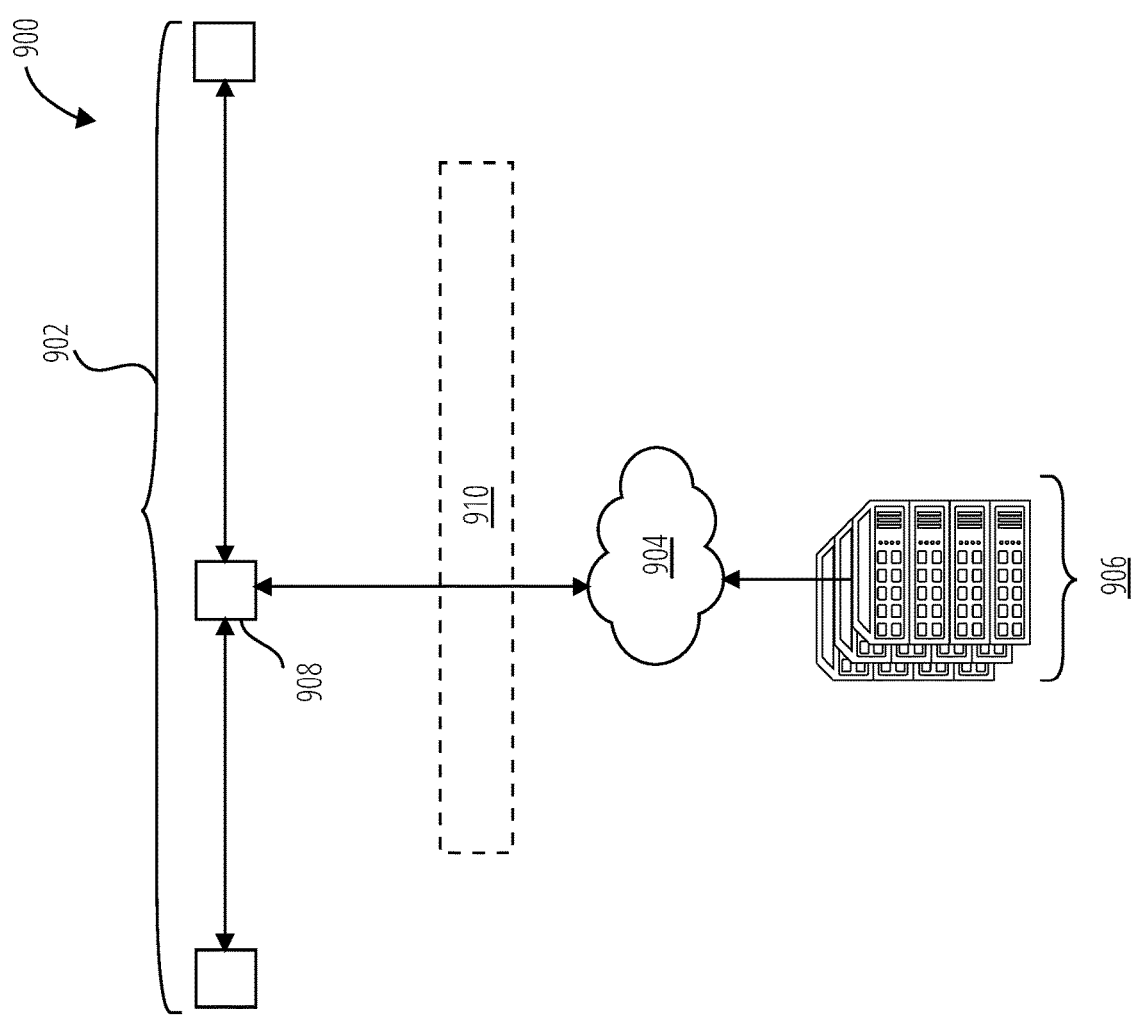
FIG. 9 illustrates an IoT system 900 in accordance with one embodiment.

FIG. 9 illustrates an IoT system 900 in one embodiment. The methods and systems of the disclosure may interact with IoT entities and\or ethernet entities, (e.g., local wind farm computer, local server, sensors, SCADA, central sensor-controllers networks). The IoT system 900 comprises IoT devices 902 communicatively coupled via a wide area network 904 to a server system 906 via an optional proxy server 910. The network topology of the IoT system 900 is a hybrid hub-and-spoke. One or more of the IoT devices 902 acts as a gateway device 908 providing a communication channel to the server system 906. The IoT devices 902 that are not the gateway device 908 communicate directly with the gateway device 908, or via the proxy server 910, which communicates on their behalf and on its own behalf with the server system 906. The optional proxy server 910 may improve the performance of the IoT system 900 by mirroring some or all of the state of the server system 906 and thus enabling the IoT devices 902 to communicate without creating bandwidth or incurring the latency of the wide area network 904. The optional proxy server 910 is typically colocated at a facility or nearby facility to where the IoT devices 902 are located.

Referring to FIG. 10, an example a code for SCADA data 1000 is shown. The SCADA data 1000 may include several parameters such as a wind parameter on a wind turbine, a performance parameter, a vibration parameter, a temperature parameter, and the like.

FIG. 11 is a continuation of the code for SCADA data 1000. The SCADA data 1000 may further include parameters such as yaw angle, blade pitch angle, etc.

The methods and systems in this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments do not limit the extent of protection of this document.

Having thus described embodiments of the present invention of the present application in detail and by reference to illustrative embodiments thereof, it will be apparent that modifications and variations are possible without departing from the scope of the present invention.

What is claimed is:

1. A method comprising:
   receiving a current Supervisory Control and Data Acquisition (SCADA) data including a current yaw setting for a wind turbine, wherein the current SCADA data is received at a yaw setting selection engine (YSSE);
   determining, using the YSSE that includes logic, whether a new dataset including at least one new yaw setting is available, the logic including:
   on condition the new dataset is available:
      receiving the new dataset;
      comparing the current yaw setting with the an at least one new yaw setting, wherein the YSSE includes logic to determine whether the current yaw setting is same as the at least one new yaw setting, the logic generating instructions to:
      on condition that the current yaw setting is not same as the at least one new yaw setting:
         send a signal to an operating control system controller to update the current yaw setting to the at least one new yaw setting on an operating control system located at the wind turbine; and
         apply the at least one new yaw setting to the operating control system; and
      on condition that the current yaw setting is same as the at least one new yaw setting:
         search for another new dataset;
   on condition the new dataset is not available:
      monitor SCADA data using the YSSE;
      send a signal to the operating control system located at the wind turbine to turn the wind turbine to a default angle to the wind if wind direction or wind velocity has changed and a prior dataset is expired, wherein the prior dataset is a dataset that was available before the new dataset; and
      apply the signal to the operating control system of the wind turbine; and
   executing the instructions if the current yaw setting is not same as the at least one new yaw setting to set a yaw of the wind turbine.

2. The method of claim 1, wherein the new dataset is generated using a central processing center and the central processing center comprises:
   an optimization system, wherein the optimization system includes logic to generate the new dataset including the at least one new yaw setting; and
   an optimized configuration settings system, wherein the optimization configuration settings system receives and stores the new dataset.

3. The method of claim 2, wherein the location of the optimized configuration settings system is at least one of the central processing center, the local network, and combinations thereof.

4. The method of claim 2, wherein the central processing center is a cloud network.

5. The method of claim 1, wherein the current SCADA data is received from a turbine condition sensor, and the turbine condition sensor includes at least one of a temperature sensor, an accelerometer, a wind sensor, a displacement sensor and combinations thereof.

6. The method of claim 1, wherein the SCADA data includes at least one of a wind parameter on a wind turbine, a performance parameter, a vibration parameter, a temperature parameter and combinations thereof.

7. The method of claim 6, wherein the wind parameter includes at least one of a wind velocity, a wind deviation, and combinations thereof.

8. The method of claim 6, wherein the performance parameter includes at least one of a power output, a rotor speed, a blade pitch angle, and combinations thereof.

9. The method of claim 1, wherein the location of the YSSE is at least one of a local network, the wind turbine, and combinations thereof.

10. The method of claim 1, wherein the new look up table includes at least one of a wind velocity, a wind direction, a yaw angle and combinations thereof.

11. The method of claim 1, wherein the turbine includes at least one of a condition sensor, a SCADA system, an operating control system, the YSSE, and combinations thereof.

12. The method of claim 1, wherein the default angle is 90 degrees.

13. The method of claim 1, wherein the new dataset includes a look up table.

* * * * *